United States Patent Office 3,428,486
Patented Feb. 18, 1969

3,428,486
POLYAMIDE-IMIDE ELECTRICAL INSULATION
Norman J. George, St. Louis, Mo., assignor to The P. D. George Company, St. Louis, Mo., a corporation of Delaware
No Drawing. Filed Jan. 4, 1965, Ser. No. 423,331
U.S. Cl. 117—218                              11 Claims
Int. Cl. H01b 17/60, 3/42; B44d 1/18

ABSTRACT OF THE DISCLOSURE

Insulated electrical conductors having a base polyester resin cured on the conductor and an over coat of a polyamide-imide resin cured on the base coat. The polyester resins include resins derived from a phthalic acid, a glycol and glycerine and also resins derived from tris(2-hydroxyethyl)isocyanurate and polycarboxylic acids and esters thereof, glycols, polyols, or mixtures thereof. The polyamide-imide resin include resins derived from tricarboxylic acids or anhydrides thereof, such as trimellitic acid or anhydride, and a polyamine, such as a phenylene diamine and such as a polyamine whose hydrocarbon containing moiety contains at least one amido group.

---

This invention relates to resins and combinations of resins and to their use in electrical insulation. More particularly, this invention relates to electrical insulation, to electrical conductors containing in combination a base insulation coat and an over insulation coat, said over coat being a polyamide-imide resin.

Synthetic resins suitable for use as electrical insulating materials, particularly materials which are satisfactory for use as slot insulation in dynamoelectric machines and for use as insulation for conductors which are to be employed as magnet wires (insulated electrical conductors) in electrical apparatus must be able to withstand extremes of mechanical, chemical, electrical and thermal stresses. Thus, wires to be employed as coil windings in electrical apparatus are generally assembled on automatic or semi-automatic coil winding machines which, by their very nature, bend, twist, stretch and compress the enameled wire in their operation. After the coils are wound, it is common practice to coat them with a varnish solution containing solvents such as ketones, alcohols, aliphatic and aromatic hydrocarbon, halogenated carbon compounds, etc. Magnet wire insulation must be resistant to these solvents. In order to conserve space in electrical apparatus, it is essential that the individual turns which make up the coils be maintained in close proximity to each other. Because of the closeness of the turns and the fact there may be a large potential gradient between adjacent turns, it is necessary that the resins employed as wire enamels have high dielectric strength to prevent short circuiting between adjacent coated wires. In the operation of electrical apparatus containing coiled wires, high temperatures are often encountered and the enamels must be able to withstand these high temperatures as well as the mechanical stresses and vibrations encountered in electrical apparatus so that the enamel coating does not soften, crack, or come off the wire.

Although a wide variety of synthetic resins have been prepared which are adaptable for use as insulation for electrical conductors such as for use as magnet wire insulation, the insulated wire is often deficient in one or more of the properties desired in the insulated wire.

Recently there have been developed certain polyamide-imide resins suitable for electrical insulation which are derived from (1) trimellitic anhydride, trimellitic acid or their equivalents and (2) diamines which resins possess good high temperature properties. However, when these resins are applied to an electrical conductor such as a magnet wire and cured they have been found to be deficient in many properties. For example, a commercial polyamide-imide resin, Amoco Chemical Company A1 Type 10, applied to a magnet wire and cured yields a wire enamel which has poor runability, poor Emerson scrape, poor dielectric properties and poor adherence.

I have now discovered that one can avoid the deficiencies which are present when polyamide-imide resins, derived from trimellitic acid or its anhydride and diamines, are applied directly to electrical conductors such as magnet wires by (1) first applying and curing a base polyester coat on the conductor and (2) then applying to the base coat and curing an over coat of a polyamide-imide polymer of a trifunctional carboxylic acid or its equivalent, such as trimellitic anhydride (TMA), trimellitic acid or their equivalents, and a diamine.

The results are surprising in view of the fact that whereas the cured polyamide-imide resin wire enamel applied directly to the wire has poor runability, poor Emerson Scrape, poor dielectric properties and poor adherence, a wire enamel containing the combination of a polyester base coat with a polyamide-imide over coat among other things has good runability, good Emerson Scrape, good dielectric properties and good adherence.

Stated another way, the combination of a polyester base coat and a polyamide-imide over coat upgrades the usefulness of polyamide-imide resins by converting them from poor to superior wire enamels. In addition the combination improves the characteristics of the polyester resin base coat.

Polyester resins are too well known to require an elaborate discussion thereof. However, they will be illustrated by the following discussion. Thermosetting polyester resins used for wire insulation are of various forms but commonly are generally characterized as the reaction products of a polyhydric alcohol, a glycol and a dicarboxylic acid or a lower alkyl ester thereof, the resin being commonly cured with a suitable catalyst, such as a metal catalyst, salts thereof, etc. such as zinc, titanium, litharge, lead, etc. Such resins have shown remarkable thermal stability when measured in accordance with standard procedures in the electrical industry. Moreover, they are readily soluble in organic solvents and can be applied to electrical conductors such as copper or aluminum wire by conventional coating methods followed by curing at high temperatures such as for example 500–1000° F.

Examples of polyester resins of the type described, which have been used to advantage for magnet wire insulation, are:

(1) An ester of a phthalic acid such as terephthalic or isophthalic acid reacted with polyols such as glycerine and/or pentaerythritol plus small quantities of silanes or siloxanes, and (2) Esters of phthalic acids such as terephthalic or isophthalic acid reacted with a polyol such as (a) Glycerine or pentaerythritol and the like, and (b) A glycol such as ethylene glycol, 1,4-butane diol or a mixture thereof, and the like.

These various polyesters are disclosed, for example, in U.S. Patents 2,686,739, dated Aug. 17, 1954; 2,686,740, dated Aug. 17, 1954; 2,889,304, dated June 2, 1959; and 2,936,296, dated May 10, 1960, and elsewhere. Other polyester formulations which are suitable for insulation are described in "Alkyl Resin Technology," Patton (Interscience Publishers 1962). These patents and publications are, by reference, incorporated into this application as if a part thereof.

Certain modified polyester resins of the thermosetting type have also been so used. These are produced by adding to the dihydric and polyhydric alcohol-phthalate polyester in essentially linear form a substantial proportion of another reactant, such as an isocyanate of the more thermally stable type, which serves as the predominant cross-linking agent in curing the resin on the conductor. One such isocyanate commonly used for this purpose is the trimer of a trisubstituted phenol or cresol blocked cyanuric acid such as Mondur SH, a product of Mobay Chemical Company, Pittsburgh, Pa., having the following structural formula:

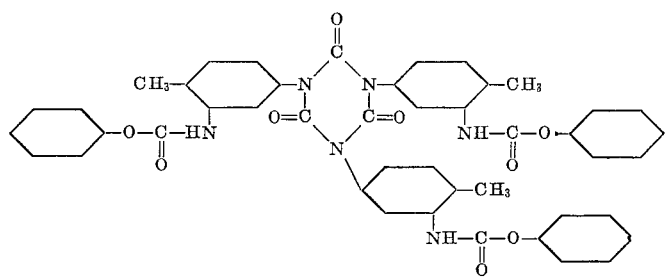

These isocyanates (such as Mondur SH) tend to improve thermal stability, reduce heat and solvent shock and, because of their active cross-linking, harden and toughen the finished film as well as improve its electrical properties. Other blocked isocyanates besides Mondur SH have also been employed. These are well known to the art.

These prior polyester resins of particular utility in the present invention can be described as thermosetting polyesters or modified polyesters which are either (a) the cured reaction product of both di- and polyhydric alcohols and a dicarboxylic acid or its ester (generally an ester of iso- or terephthalic acid) or (b) formed by adding to the components included under (a) above, in linear polymeric form, a cross-linking reactant such as an isocyanate of the type described above, and curing the resin with this additional reactant. More briefly, they may be described as thermosetting polyester or modified polyester resins of the dihydric alcohol-polyhydric alcohol-dicarboxylate type. The inclusion of a metal catalyst in the resin solution, such as zinc, lead, titanium, etc., tends to promote cross-linkage and increase the cure rate.

Another particular class of polyester resins are described and claimed in copending U.S. patent application S.N. 312,320, of Norman J. George and Alexander Kitun, filed Sept. 30, 1963, now U.S. Patent No. 3,297,785, granted on Jan. 10, 1967, and in copending U.S. patent application S.N. 358,928, of Norman J. George and Alexander Kitun, filed Apr. 10, 1964, now U.S. Patent No. 3,312,645, granted on Apr. 4, 1967, which are by reference incorporated into the present application.

These applications relate to polyested resins derived from polyfunctional derivatives of isocyanuric acid which contain a plurality of alkyl-X groups where X is—OH or

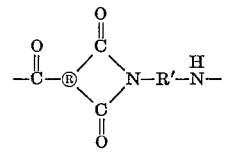

and where R is H or an alcohol moiety, preferably tris(2-hydroxyethyl) isocyanurate. These polyesters are prepared from (1) polycarboxylic acids, esters, etc. (2) glycols and (3) polyols, wherein (1), (2) or (3) are replaced in whole or in part by isocyanuric derivatives. For example, esters of this type are prepared from (1) a phthalic acid or ester thereof preferably iso- or terephthalic ester (2) ethylene glycol and (3) tris (2-hydroxyethyl) isocyanurate. Modifications thereof are disclosed in these patent applications.

The over coat of polyamide-imide resin is characterized by having recurrent units from a diamine and a tricarboxylic acid, such as trimellitic acid, its anhydride or equivalents for example of the formula

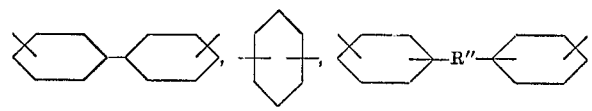

where Ⓡ is a moiety of the tricarboxylic acid, preferably having benzenoid unsaturation, and R' is a moiety of the diamine containing at least two carbon atoms, preferably having benzenoid unsaturation. Stated another way, these polymers are polyamide-imides of tricarboxylic acids or their equivalents, and diamines.

The organic diamines usable in this invention are those having the structural formula $H_2N—R'—NH_2$, wherein R', a divalent radical containing at least 2 carbon atoms, may be aromatic, aliphatic, cycloaliphatic, a combination of aromatic and aliphatic or substituted groups thereof, etc. The most useful diamines are the primary diamines which, upon reaction with the trifunctional acids may provide polyamide-acids which are then converted into the polyamideimides. The preferred R' groups in these diamines are those containing at least six carbon atoms and characterized by benzenoid unsaturation. More specifically these groups are:

and the like, where R" is carbon, nitrogen, oxygen, silicon, phosphorus, or sulphur.

Among the diamines which are suitable for use in the present invention are:

4,4'-diamino-diphenyl propane;
4,4'-diamino-diphenyl methane;
benzidine;
3,3'-dichloro-benzidine;
4,4'-diamino-diphenyl sulfide;
3,3'-diamino-diphenyl sulfone;
4,4'-diamino-diphenyl sufone;
4,4'-diamino-diphenyl ether;
1,5-diamino-naphthalene;
meta-phenylenediamine;
para-phenylene-diamine;
3,3'-dimethyl-4,4'-biphenyl diamine;
3,3'-dimethoxy benzidine;
bis(beta-amino-t-butyl) toluene;
bis(para-beta-amino-t-butyl-phenyl) ether;
bis-(para-beta-methyl-delta-amino-pentyl) benzene;
bis-para-(1,1-dimethyl-5-amino-pentyl) benzene;
1-isopropyl-2,4-metaphenylene diamine;
m-xylylene diamine;

p-xylylene diamine;
di(para-amino-cyclohexyl)methane;
hexamethylene diamine;
heptamethylene diamine;
octamethylene diamine;
nonamethylene diamine;
decamethylene diamine;
diamino-propyl tetramethylene diamine;
3-methylheptamethylene diamine;
4,4-dimethylheptamethylene diamine;
2,11-diaminododecane;
1,2-bis-(3-amino-propoxy)ethane;
2,2-dimethylpropylene diamine;
3-methoxy-hexamethylene diamine;
2,5-dimethylhexamethylene diamine;
2,5-dimethylheptamethylenediamine;
3-methylheptamethylene diamine;
5-methylnonamethylenediamine;
2,11-diamino-dodecane;
2,17-diamino-eicosadecane;
1,4-diamino-cyclohexane;
1,10-diamino-1,10-dimethyl decane;
1,12-diamino-octadecane;
$H_2N(CH_2)_3O(CH_2)_2O(CH_2)_2NH_2$;
$H_2N(CH_2)_3S(CH_2)_3NH_2$;
$H_2N(CH_2)_3N(CH_3)(CH_2)_3NH_2$;
piperazine. A plurality of the above polyamines can also be employed, for example 2, 3, 4 or more of these amines, in preparing the polymer.

The tricarboxylic acid is characterized by the formula

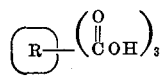

where ⓡ is the moiety of the acid.

Although trimellitic acid or its anhydride (TMA) is the preferred embodiment, other suitable tricarboxylic acids or anhydrides can also be employed, for example:

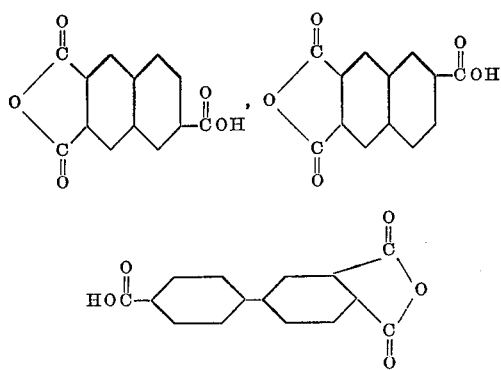

or isomers thereof,

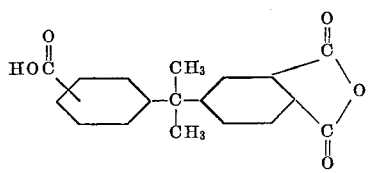

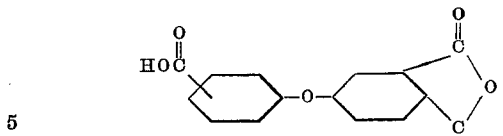

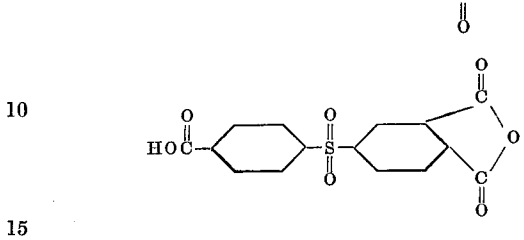

and the like.

Aromatic tricarboxylic acids are preferred.

The polyamine-imide resins can be prepared by a variety of methods. The reaction may be viewed as occurring in stages.

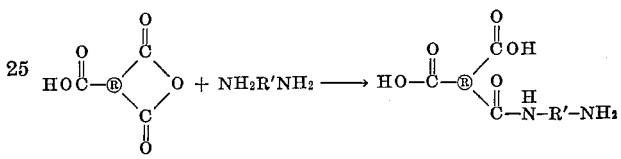

which is further reacted to yield a polyamide

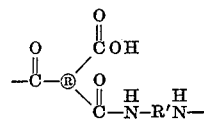

which is further reacted to form the polyamine-imide.

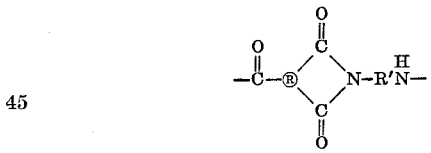

Thus, in essence, the reaction is a condensation reaction yielding amides at the first stages and imides in the second stage. Since water is released during the polymerization condensation, its removal is an index of the progress of the reaction. In general, it is believed that reaction with the anhydride group occurs first, thereupon amidification occurs with the nonanhydride carboxylic group. These reactions in general occur at lower temperatures. Thereupon as the temperature is raised imidification occurs.

Polyamide-imide resins are prepared by any suitable method. In general, they are prepared by reacting TMA and the diamine under dehydrating conditions, with or without a solvent. Any suitable temperature capable of dehydration can be employed, for example 300–400° F. or higher. In general, the higher the temperature the shorter the reaction time. If desired toward the end of polymerization, small amounts of reactive compounds capable of combining with the reactants can be employed to drive the polymerization to completion, for example cyclic alkylene lactams. In general, it is advisable to heat and agitate the reaction mixture until maximum viscosity denoting maximum polymerization is obtained.

The degree of polymerization is subject to deliberate control. The use of equal molar amounts of the reactants under the prescribed conditions provides a very high molecular weight. The use of either reactant in a large excess limits the extent of polymerization, but may be employed if desired.

In general, it is not desirable to employ more than 5% excess of either the diamine or TMA. More than 5% excess of either reactant generally results in undesirably low molecular weight resins. For some purposes, it is desirable to use 1–3% excess of either reactant, preferably diamine.

The solvents useful in the solution polymerization process for synthesizing the polyamide-imides or as solvents for the products are the organic polar solvents having a dipole moment whose functional groups do not react with the diamines or the TMA. Besides being inert to the system and being a solvent for the product, the organic polar solvent must also be a solvent for at least one of the reactants, preferably for both. Solvents of the N,N-dialkylcarboxylamide class are useful as solvents in the process with the preferred solvents being the lower molecular weight members of this class, in particular N,N-dimethylformamide and N,N-dimethylacetamide. These solvents may be easily removed from the polymer by evaporation, displacement or diffusion. Other typical compounds of this class of solvents are: N,N-diethylformamide, N,N-diethylacetamide, N,N-dimethylmethoxy acetamide, etc. Additional organic polar solvents which may be used in the present invention are: dimethyl-sulfoxide, N-methyl-2-pyrrolidone, pyridine, dimethylsulfone, hexamethylphosphoramide, tetramethylene sulfone, dimethyltetramethylene sulfone. The solvents can be used alone, in combination of solvents, or in combination with nonsolvents such as benzene, benzonitrile, dioxane, butyrolactone, xylene, toluene, and other polyalkyl benzenes, mineral spirits, cresols, cresylic acid, cyclohexane, etc. However, the addition of water should be avoided and the process should be conducted under essentially anhydrous conditions.

These solvents are also employed in preparing solutions for application to the wire.

When the polyester base coat and the polyamide-imide over coat resins of the present invention are to be employed as magnet wire enamels, the resins are applied to the wires from solution by well-known methods. For optimum results I have found that solutions containing from about 25 to 40 percent resin solids should be employed. These solutions can be prepared by diluting higher concentration resin solutions with any of the resin solvents mentioned herein, or in the references incorporated herein.

The method of applying both types of resins to wire comprises passing the wire through the resin solution, through a suitable die, and then through an oven maintained at an elevated temperature to cure the resin on the wire. Where desired, the wire may be passed through the resin solution and a die a number of times and through the oven after each pass through the resin solution. This will provide a greater enamel build than is obtainable with only one pass through the resin solution. Although the die sizes are not critical, I prefer to employ dies which provide a clearance of from two to four mils around the wire. The speed at which the wire is passed through the resin solution and the temperature at which the oven is maintained depend on the particular resin solution employed, the build of enamel desired, the length of the oven in which the coated wire is cured, and the molecular weight of the resin used in the coating operation. I have found that a total enamel build on a 40.3 mil or 18 wire round copper wire of about 3 mils (diameter of enameled wire less diameter of bare wire) may be obtained by passing the wire through a solution containing 25–35%, by weight, of a suitable resin and through a heating tower 18 feet long at speeds of from about 15 to 40 feet per minute when the temperature of the curing oven is maintained at from about 600° F. to 1000° F. In general, the higher the wire speed, the higher is the optimum wire tower temperature. In the coating operation just described, the wire is generally passed through the resin solution and a wire tower as many times as required to obtain the desired build, generally a total of about six times. In addition, the wire can be coated by dip application, groove rolls, etc.

In order to insure complete curing of both types of resins of the present invention when applying them to conductors, it is desirable to employ a curing catalyst to accelerate the curing reaction in the resin solutions during the coating operation, although satisfactory results are obtained without the use of such a catalyst. Among the many curing catalysts suitable for this purpose may be the soluble salts of Zn, Pb, Ti, Cd, Bo, Th, etc., for example zinc octoate, cadmium octoate, copper naphthenate, tetraisopropyl titanate, tetrabutyl titanate, etc., blocked aromatic isocyanates, blocked aliphatic isocyanates, may be employed with the polyesters, etc. Where metal-containing curing catalysts are employed I have obtained satisfactory results using from about 0.05 to 3.0 or more percent, by weight, of the metal element of the catalyst based on total resin solids. Preferably, one employs sufficient metal-containing catalyst to give about 0.1–2.0 percent metal based on the total resin solids.

The build of the over coat in relation to the base coat should be sufficient to impart the desired properties thereto. For example, the top coat may be about 5% by volume of the total enamel coat, for example 10–50% or more, such as 10–40%, but preferably about 14–25%. Although larger volumes of over coat can be employed, in practice and for economic reasons I employ the minimum amount of over coat capable of imparting the desired properties to the wire. For example, I have satisfactorily employed an over coat layer obtained by one pass through the polyamide-imide resin solution to a base coat layer obtained by 5 to 6 passes through the polyester resin.

The following examples are presented for purposes of illustration and not of limitation.

These base coat resins comprise the reaction of: (1) from about 25 to 56 equivalent percent, preferably from about 36 to 50 equivalent percent of a lower dialkyl ester of terephthalic acid and isophthalic acids and mixtures thereof or their equivalent, (2) from about 15 to 46 equivalent percent, and preferably from about 25 to 40 equivalent percent of ethylene glycol, and (3) from about 13 to 44 equivalent percent of a saturated aliphatic polyhydric alcohol having at least three hydroxy groups.

EXAMPLE 1

A polyester resin is prepared from the following ingredients:

| | Equiv. percent |
|---|---|
| Dimethyl terephthalate | 46 |
| Ethylene glycol | 31 |
| Glycerin (95%) | 23 |

These ingredients plus xylene are added to a three liter, three-necked flask, fitted with a thermometer, stirrer, and a five inch Vigreux column. A Dean and Stark trap and an addition funnel are attached to the top of the column and a nitrogen blanket is maintained on the system. The system is heated for 30 minutes, during which time the temperature rises to about 130° C., and water and xylene are azeotropically distilled from the system. At this time about 0.03 percent lead acetate based on the weight of dimethyl terephthalate is added and the heating is continued for three and one-half more hours to a final temperature of about 240° C. Sufficient cresol is then added to the hot resin to form a solution having a solids content of 44.8 percent by weight. A portion of this solution is cut to a solids content of 25 percent with xylene after sufficient zinc octanoate has been added to give 0.5 percent zinc based on total resin solids. This solution is used to apply the resin to the wire.

Other base coat polyester resins similarly prepared are presented in the following table. DMI is dimethylisophthalate; DMT is dimethylterephthalate.

TABLE I

| Example | Equivalent percent dimethyl terephthalate | Equivalent percent ethylene glycol | Equivalent percent glycerin |
|---|---|---|---|
| 2 | 50 | 25 | 25 |
| 3 | 46 | 26 | 28 |
| 4 | 45 | 27 | 28 |
| 5 | 46 | 17 | 37 |
| 6 | 50 | 15 | 35 |
| 7 | 37 | 19 | 44 |
| 8 | 37 | 32 | 31 |
| 9 | 25 | 38 | 37 |
| 10 | 36 | 46 | 18 |
| 11 | 46 | 39 | 15 |
| 12 | 50 | 36 | 14 |
| 13 | 56 | 22 | 22 |
| 14 | 45 | 33 | 22 |
| 15 | DMI 2.3 DMT 43.7 | 31 | 23 |
| 16 | DMI 5.8 DMT 40.2 | 31 | 23 |
| 17 | DMI 9.8 DMT 36.2 | 31 | 23 |
| 18 | DMI 23 DMT 23 | 31 | 23 |
| 19 | 46 | 31 | 23 |
| 20 | 40 | 40 | (1) |
| 21 | 46 | 31 | (2) |
| 22 | 37.5 | 37.5 | (3) (4) |

[1] 1,1-trimethylol ethane 20%.
[2] Glycerin 20.7%.
[3] Diglycorol 2.3%.
[4] Sorbitol 25%.

The following example illustrates the use of blocked isocyanurates in the polyester formulation.

EXAMPLE 23

Mondur SH is gradually added to the polyester resin of Example 1 at 100–120° C. over a period of about a half hour at the ratio of 1 part of Mondur SH to 3.5 parts of the polyester and maintained at this temperature for about 1 hour. Tetrabutyl titanate (.05%) is added as a curing agent.

The following polyester resins are similarly treated with Mondur SH and applied as base coat wire enamels.

| Example: | Polyester resin of example |
|---|---|
| 24 | 2 |
| 25 | 5 |
| 26 | 8 |
| 27 | 12 |
| 28 | 16 |
| 29 | 21 |

Base coats of polyesters prepared from tris (2-hydroxyethyl) isocyanurate (THIC) are also employed in this invention such as described in application S.N. 312,320 of Norman J. George and Alexander Kitun, filed Sept. 30, 1963, now U.S. Patent No. 3,297,785, granted on Jan. 10, 1967. Specific examples of such resins are disclosed in Table II of this application.

The following table presents examples of such resins employed as the base coat in the present invention.

The isocyanurate polyesters employed may comprise the product of (1) from about 20–60 equivalent percent, such as from about 25–55%, but preferably from about 35–50% of a polycarboxylic acid; (2) from about 10–50 equivalent percent, such as from about 15–45, but preferably from about 25–40% of a glycol; and (3) from about 10–60 equivalent percent, such as from 15–50%, but preferably from about 20–35% of the polyol (including THIC).

TABLE II

| Ex. | S.N. 312,320, now U.S. Patent No. 3,297,785, Example | Equivalent percent dimethyl phthalate | Equivalent percent ethylene glycol | Equivalent percent THIC | Weight (percent) additive (based on resin) |
|---|---|---|---|---|---|
| 30 | 1 | 45.8 | 29.0 | 25.2 | |
| 31 | 5 | 44.4 | 31.1 | 24.5 | |
| 32 | 8 | 45.8 | 29.0 | 25.2 | |
| 33 | 9 | 44.5 | 31.1 | 24.4 | |
| 34 | 17 | 44.3 | 28.0 | 27.7 | |
| 35 | 21 | 43.4 | 27.6 | 29.0 | |
| 36 | 23 | 43.35 | 29.10 | 27.55 | |
| 37 | 23 | 43.35 | 29.10 | 27.55 | 2% melamine. |
| 38 | 23 | 43.35 | 29.10 | 27.55 | 2% melamine plus 1% Zn. |
| 39 | 23 | 43.35 | 29.10 | 27.55 | 3% melamine. |
| 40 | 23 | 43.35 | 29.10 | 27.55 | 2% melamine plus Cu 0.06. |
| 41 | | 48.0 | 31.0 | 21.0 | |

By way of illustration, Example 41 is prepared in accord with S.N. 312,320, now U.S. Patent No. 3,297,785.

Dimethylphthalate (9.01 moles, 1750.0 g.) and THIC (3.94 moles, 1030.0 g.) are placed in a flask equipped with an inert gas inlet, an agitator and condenser take off and heated to 280° F. Litharge (3.0 g.) is then added and the mixture is heated to 400° F. until a "T" viscosity at a concentration of 37% in cresylic acid is obtained. Ethylene glycol (5.64 M, 350.0 g.) is then added and esterification continued at 400° F. until a viscosity of Z3–Z4 is obtained at 31% solids in a solvent which is 60% cresylic acid, 20% Solvesso 100 solvent and 20% Solvesso 150 solvent. This 31% solution is employed in applying the resin to the wire.

Oil modified polyester resins can also be employed, for example the oil-modified polyesters described in U.S. Patent 2,905,650, for example, Example 1 thereof derived from dimethyl phthalate 2.0 M, ethylene glycol 2.2 M, glycerine 0.377 M and soya oil 0.189 M; and also the oil modified THIC resins disclosed in application S.N. 358,928, now U.S. Patent No. 3,312,645.

Other examples of polyester resins which can be employed as a base coat can be found in the following patents:

U.S. patents:
    2,686,739 (silicone modified)
    2,686,740 (silicone modified)
    2,687,396 (silicon-epoxy-phenol resins modified)
    2,687,398 (silicone-epoxy-modified)
    2,686,740 (silicone modified)

The above polyester resins are employed to base coat round copper wire. In most instances the resin is applied by passing the conductor through the resin solution, a suitable die, and a vertical wire tower at a wire speed of 20–40 ft./min. at 600–800° F. with 3–6 passes being employed to obtain the final base coat build, but preferably 5 passes.

The over coat polyamide-imide resin is similarly applied to the cured polyester wire enamel resulting in a base polyester coat and an overcoat of polyamide-imide resin. It is generally applied in 1–3 passes to obtain the final over coat build, but preferably 1 pass.

The total build is usually about 3 mils such as 2.9–3.2 mils.

The following example illustrates the preparation of a polyamide-imide resin.

Example.—Table III, 6

To a flask equipped with an inert gas inlet, an agitator, a thermometer and a sampling port are charged TMA (10 moles) and m-phenylene diamine (09.8 mole). This mixture is heated to approximately 300° F. and litharge (3.0 g. is added. Heating is continued until the temperature is slowly raised to approximately 370° F. When the reaction slows down, heat is reduced to about 320° F. and ε-caprolactam (1 mole)[1] is added and heating continued to a tem- ---
[1] Caprolactam is employed to push the reaction to completion. Other reactive compounds capable of doing this may also be employed.

perature of 370° F. Reaction is terminated by adding solvent (N-methyl pyrrolidone 75% and dimethyl acetamide 25%) when a viscosity of 1600 cps. at 36% concentration in this solvent is reached. This solution is used to apply the resin to the wire as an over coat.

The following are other specific examples of over coat polyamide-imide resins which can be employed in this invention. They are prepared in the manner of Example, Table III, 6, both with or without the caprolactam.

TABLE III.—POLYMER UNIT

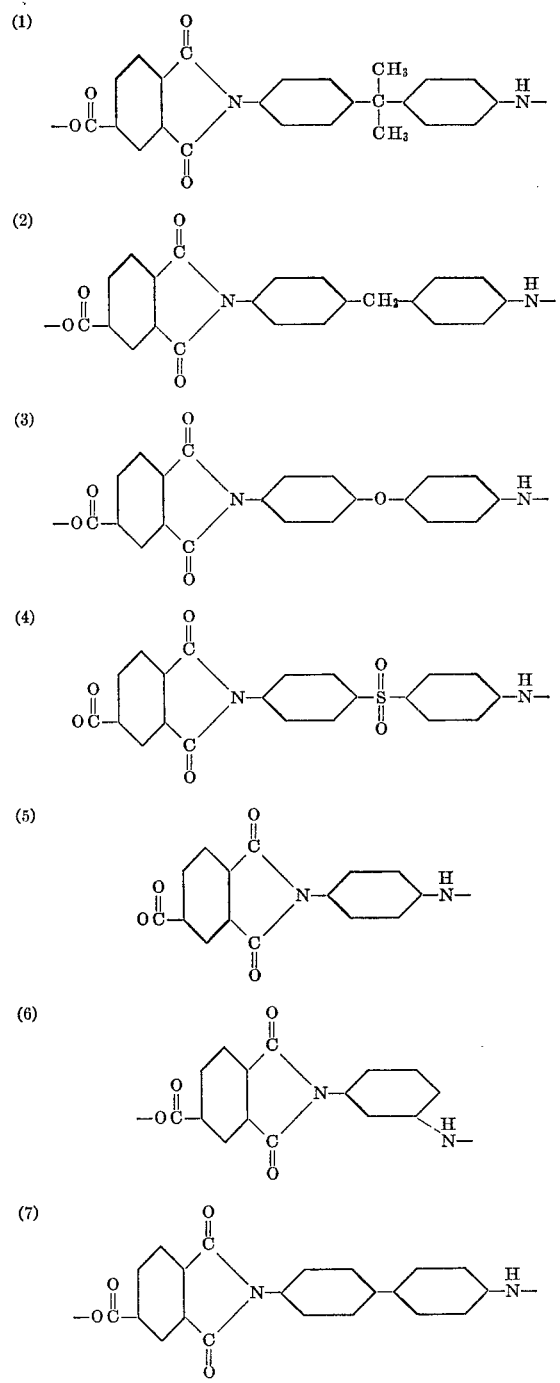

A polyamide-imide resin characterized by the polymeric unit of Table III, 6 is currently being produced commercially.

One class of polyamines useful in preparing the polyamide-imide resin of this invention are those polyamines which contain at least one amido unit within the R' group. These are formed by reacting any of the above diamines, $NH_2R'NH_2$, with the appropriate carboxylic acid or its equivalent, preferably an aromatic carboxylic acid, and most preferably a phthalic acid such as an ortho-, meta-(iso), or para-(tere)phthalic, but preferably a meta- or a tere-phthalic acid or its equivalent. In practice an acid halide is employed, for example

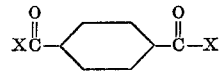

where X is a halogen, i.e. chlorine, bromine, etc. Although phthalic acids are preferred, other carboxylic acids can be employed, for example,

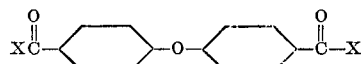

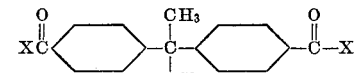

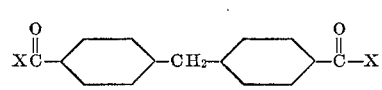

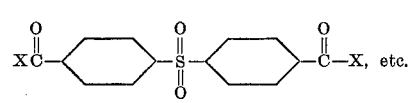

These compounds may also be prepared by reacting an aromatic acid halide, such a diacyl halide or a nitroacyl halide, with a substantially stoichiometric amount of a suitable compound for example a nitro-amine or a primary aromatic diamine. The nitro aromatic compound is reduced, as for example by hydrogenation, to the corresponding diamino aromatic compound.

These reactions are illustrated by the following equations:

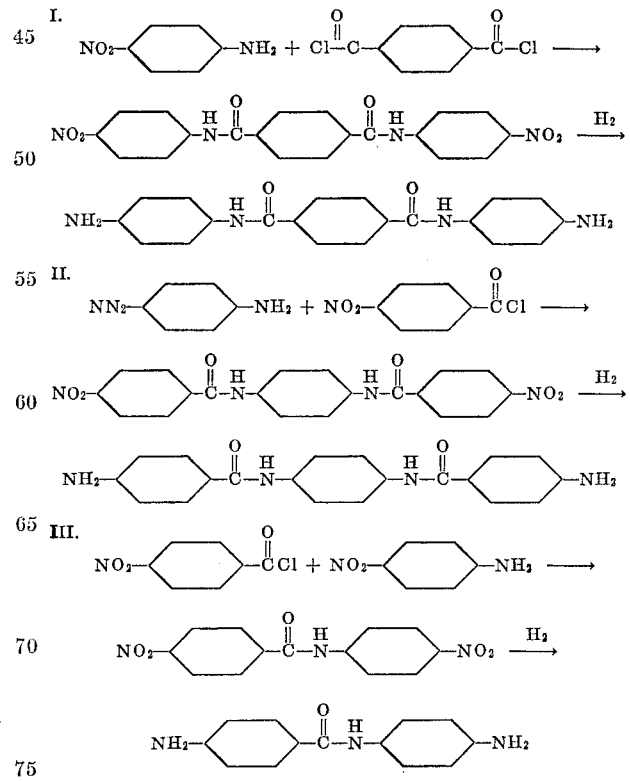

Direct reaction, without hydrogenation, is illustrated by the following reactions:

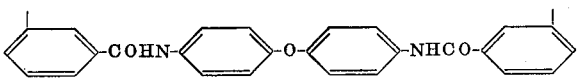

I.

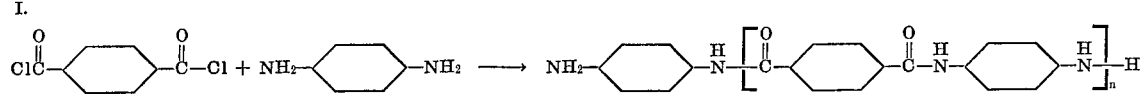

II.

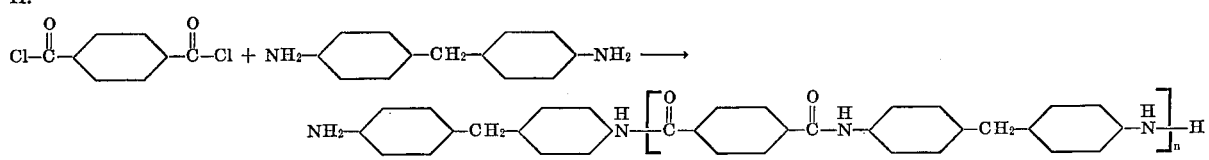

(III)

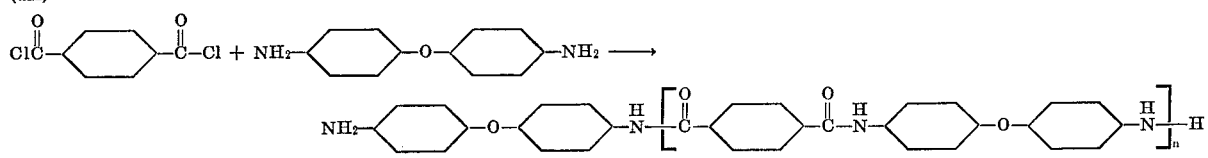

Three amide-containing diamines can be employed to prepare polyamide-imide resins of the formula

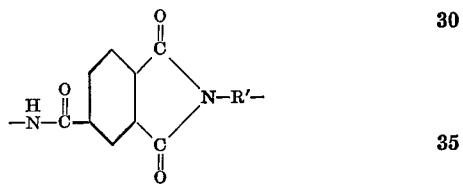

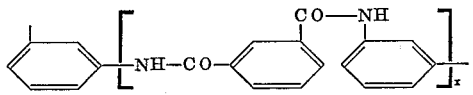

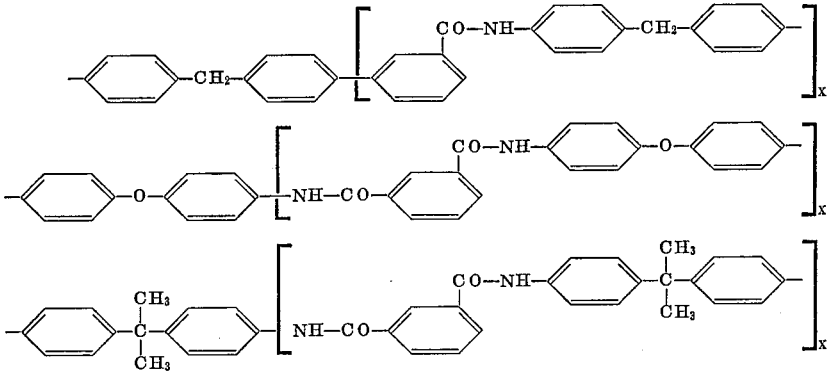

where R' is, for example,

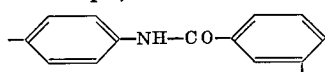

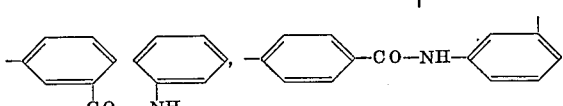

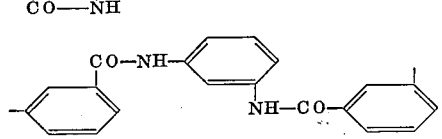

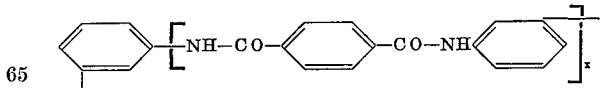

in which X represents an integer of from 1 to 500. Copolymers, comprising two or more of these R' groups, have been found to be especially valuable in some cases.

Corresponding R's can also be derived from the other diamines, NH₂—R'—NH₂, described herein.

In addition, a polymer can be prepared by first reacting TMA with an excess of diamine to yield an amino-terminated product, and then reacting this product with the acyl halide. This is illustrated by the following equation:

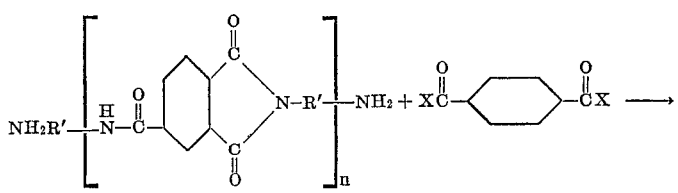

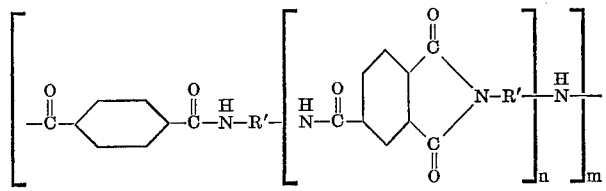

Where the polyamine has a plurality of amide groups, the resulting polymer is a block polymer, whether prepared (1) by reacting the diacyl halide with an amino-terminated polyamide-imide or (2) by reacting a diamino-polyamide with TMA. Stated another way the polymer is characterized by distinct polyamide units and distinct polyamide-imide units.

Thus, these polymers are prepared (A) by reacting at least one amide or polyamide having two terminal primary aromatic amino groups with trimellitic anhydride or its equivalent, or (B) reacting at least one primary aromatic diamine with trimellitic anhydride and then reacting this product having terminal amino groups with at least one aromatic dibasic acid halide.

The following examples are presented by way of illustration and not of limitation.

Example A.—A polymer is prepared by reacting m-phenylene diamine with terephthaloyl chloride in dimethylacetamide with a triethyl amine present at 35–40° C.

A polymer of the following formula is formed:

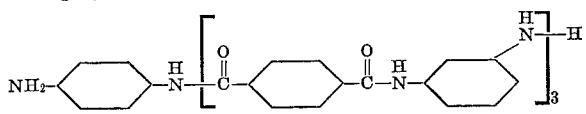

Example B.—The diamine polymer of Example A is reacted with TMA at 300–400° F. to form a polyamide-imide presented by the following idealized formula:

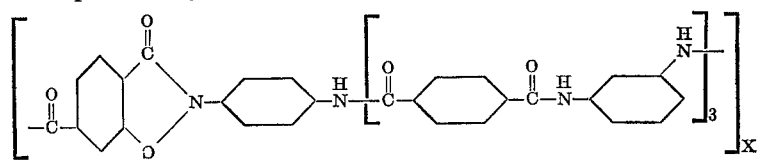

Example C.—This example illustrates the preparation of a diamino polyamide-imide and subsequent reaction with an aromatic diacid chloride.

A solution of an excess of m-phenylene diamine in dimethylacetamide is stirred while TMA is added and polymerized. Triethylamine is added thereto. This solution is stirred rapidly while isophthaloyl chloride is added thereto to form the desired polymer, which is a block polymer containing both polyamide-imide and polyamide block units.

These polymers are useful as wire coatings, molding and laminating resins, films for electrical insulating or mechanical use, varnish components, etc. In addition, they can be employed as an over coat in accord with this invention.

The following Table IV very clearly illustrates the superiority of the present invention which employs a base polyester coat and a polyamide-imide over coat. The base coat applied is the resin described in Example 41 of this application, Table II, and the over coat is the Amoco Chemical Co. 1A type 10 resin which is a commercial polyamide-imide resin. Both resins are coated and cured in the conventional manner employing a coating die and a wire tower. The volume ratio of base coat to over coat is 5 to 1, i.e. 5 passes of the polyester to 1 pass of the polyamide-imide resin. The combination of resins is superior to each individually.

TABLE IV

| | Amoco 1A type 10 resin | Combination polyester base coat (5 volumes) Amoco 1A, type 10 top coat (1 volume) |
|---|---|---|
| Oven temp | 680° F | 680° F. |
| Wire speed | 35 ft | 35 ft. |
| Smoothness | Sandy and grainy | Smooth. |
| Snap plus 1X | Fails 3XD, OK 4XD | OK 2XD. |
| Adherence | Poor | Good. |
| Elongation | 31% | 35%. |
| Elongation plus 1X | Fails 2XD, OK 3XD | OK 1XD. |
| Scott Twist | 94 | 128. |
| Tesla blow test | 5 breaks at 10 ft | 4 breaks at 10 ft. |
| G.E. abrasion | (490 g.) 127 | (700 g.) 102. |
| Cut thru ° F. potentiometer. | 600° F | 679° F. |
| Dielectric | 3,400 v | 11,500 v. |
| Emerson Scrape | 9 pounds | 32 pounds. |
| Heat aged 1 hr. at 300° C., unstretched. | OK 1XD | OK 1XD, OK 2XD, OK 3XD. |
| 15% elongated 1 hr. 300° C. | Fails 1XD, OK 2XD | Fails 1XD, OK 2XD, OK 3XD. |
| Exact mandrel | OK | OK. |
| Snap | OK | OK. |
| Boil 1-toluol 1-alcohol | OK 30 min | OK 30 min. |

From the above Table IV it is quite evident that when applied to an electrical conductor a polyamide-imide resin is unexpectedly improved by a polyester base coat in combination with a polyamide-imide over coat. In like manner, other polyester base coats and other polyamide-imide over coats can also be employed in the present invention. For example, any of the polyester resins applied as base coats and any of the polyamide-imide resins applied as top coats described herein also produce an improved electrical conductor. Thus, the base polyester resins of Table I are employed in conjunction with the polyamide-imide resins of Table III in volume ratios of 5:1, polyester to polyamide-imide.

Although the invention has been illustrated by application to a wire of the magnet wire type, it should be understood that it can also be applied to other materials where such a combination of coatings yield an improved product.

As is quite evident, polyesters and polyamide-imide resins will be constantly developed which could be useful in this invention. It is, therefore, not only impossible to attempt a comprehensive catalogue of such compositions, but to attempt to describe the invention in its broader aspects in terms of specific chemical names of the components used would be too voluminous and unnecessary since one skilled in the are could by following the description of the invention herein select a useful polyester and a polyamide-imide resin. This invention lies in the use of suitable polyesters and polyamide-imide resins in conjunction with electrical conductors and their individual compositions are important only in the sense that their properties can affect this function. To precisely define each specific useful resin in light of the present disclosure would merely call for knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific polyester and polyamide-imide resins suitable for this invention. In analogy to the case of a machine, wherein the use of certain materials of construction or dimensions of parts would lead to no practical useful result, various materials will be rejected as inapplicable where others would be operative. I can obviously assume that no one will wish to use a useless polyester resin or a useless polyamide-imide resin nor will be misled because it is possible to misapply the teachings of the present disclosure to do so. Thus, any polyester resin or polyamide-imide resin that can perform the functions stated herein can be employed.

Having thus described my invention, what I claim as new and desire to obtain by Letters Patent is:

1. An insulated electrical conductor characterized by a base coat of a polyester resin cured on the conductor and an over coat of a polyamide-imide resin cured on the base coat, said polyamide-imide resin being derived from (I) a member selected from the group consisting of a tricarboxylic acid and a tricarboxylic acid anhydride and (II) a diamine.

2. The product of claim 1 where the polyester resin base coat is derived from a phthalic acid, a glycol and glycerine and (I) is trimellitic acid anhydride.

3. The product of claim 1 where the base coat polyester resin is derived from tris(2-hydroxy-ethyl) isocyanurate and a member selected from the group consisting of (1) polycarboxylic acids and esters thereof, (2) glycols, (3) polyols and (4) mixtures thereof, and (I) is trimellitic acid anhydride.

4. The product of claim 3 wherein (II) is an aromatic diamine.

5. The insulated electrical conductor of claim 4 wherein the aromatic diamine is phenylene diamine.

6. The product of claim 1 wherein (I) is trimellitic acid anhydride and (II) is an aromatic diamine.

7. The insulated electrical conductor of claim 6 wherein the aromatic diamine is phenylene diamine.

8. An insulated electrical conductor characterized by a base coat of a polyester resin cured on the conductor, said polyester resin being derived from tris(2-hydroxyethyl) isocyanurate, ethylene glycol and a phthalic acid; and an over coat of a polyamide-imide resin cured on the base coat, said polyamide-imide resin being derived from trimellitic anhydride and phenylene diamine.

9. An insulated conductor characterized by a base coat of a polyester resin cured on the conductor and an over coat of a polyamide-imide resin cured on the base coat, said polyamide-imide resin containing at least one amido group which is not part of the amide-imide polymeric unit.

10. An insulated conductor characterized by a base coat of a polyester resin cured on the conductor and an over coat of a polyamide-imide resin cured on the base coat, said polyamide-imide resin being derived from trimellitic anhydride and an aromatic diamine containing at least one amido group which is not part of the amide-imide polymeric unit.

11. An insulated conductor characterized by a base coat of a polyester resin cured on the conductor and an over coat of a polyamide-imide resin cured on the base coat, said polyamide-imide resin having the polymer unit

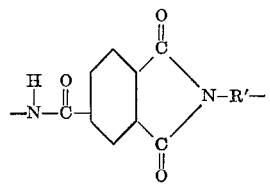

where R' is a divalent hydrocarbon radical and contains at least one amido group.

References Cited

UNITED STATES PATENTS 3,105,775 10/1963 Lavin et al. _____ 117—218
3,190,770 6/1965 Lavin et al. _____ 117—218
3,297,785 1/1967 George et al. _____ 260—850

WILLIAM D. MARTIN, *Primary Examiner.*

R. HUSACK, *Assistant Examiner.*

U.S. Cl. X.R.

117—232, 161; 260—78